Sept. 13, 1927.                A. WESTGARD                1,642,185
                              SAW CONSTRUCTION
                             Filed Feb. 19, 1925
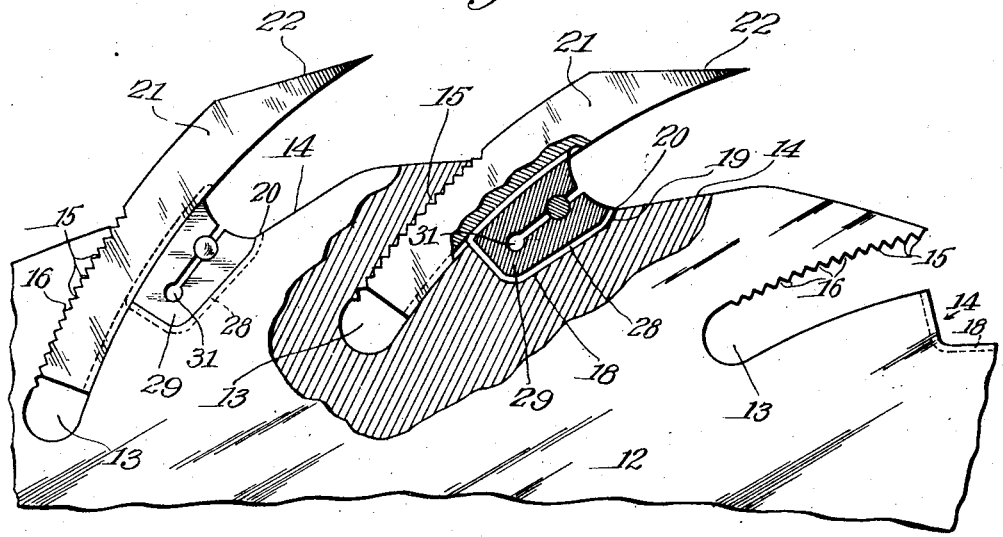
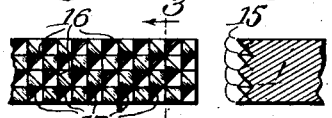
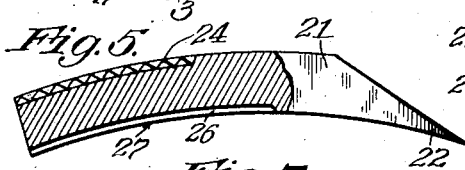
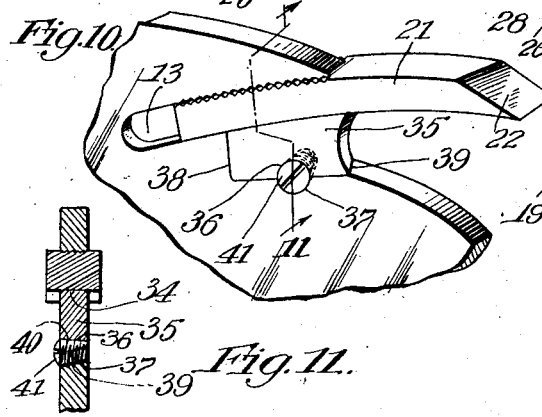
Inventor:
Anton Westgard.
By Mason, Fenwick & Lawrence
           Attorneys Patented Sept. 13, 1927.

1,642,185

UNITED STATES PATENT OFFICE.

ANTON WESTGARD, OF CHICAGO, ILLINOIS.

SAW CONSTRUCTION.

Application filed February 19, 1925. Serial No. 10,318.

This invention relates to a novel saw construction having detachable teeth, but it is also applicable to other tools having detachable working parts.

The invention embodies novel means for holding the detachable teeth in the body of the saw so that the teeth will be held more firmly or tightly locked against displacement and may be quickly and minutely adjusted without possibility of loosening or accidentally shifting sidewise or laterally, as well as allowing greater adjustment either in extending the same from the periphery of the saw body or longitudinally as well as laterally to either side.

A further object of the invention is to provide for minute adjustment of the teeth or working parts of the tool to compensate for wear thereon which will enable rapid adjustment or displacement and replacement of the worn or damaged parts.

A further object of the invention is to permit a very smooth cut in connection with wood or metal, as well as the use of the device for cross-cutting, ripping or finishing purposes.

With the above and other objects in view, the invention consists in certain novel combinations and arrangements of parts as will be hereinafter more fully set forth and described.

In the accompanying drawings:

Fig. 1 is a sectional side elevation showing a fragmentary portion of a circular saw blade with teeth held therein, part being in section and broken away to show the manner of securing the teeth in position and for adjusting the same.

Fig. 2 is a fragmentary view showing the side or upper surface of a slot or recess in the saw blade or body.

Fig. 3 is a cross-sectional view taken on the line 3—3 of Fig. 2.

Fig. 4 is a top plan view of a tooth.

Fig. 5 is a longitudinal sectional view taken on the line 5—5 of Fig. 4.

Fig. 6 is an underside plan view of the tooth.

Fig. 7 is a perspective view of a spring locking member for securing the teeth in position.

Fig. 8 is an enlarged sectional view taken on the line 8—8 of Fig. 1 and showing the tooth adjusted to one position.

Fig. 9 is a view similar to Fig. 8 but showing another adjustment of the tooth.

Fig. 10 is a fragmentary perspective view of a modified form of securing means, and Fig. 11 is a sectional view taken on the line 11—11 of Fig. 10.

Referring to the drawings in detail, in which like reference characters refer to corresponding parts throughout the several views, 12 designates a circular saw body in the form of a disc having teeth receiving recesses or slots 13 and cut away as at 14 to provide for clearance or a raking action.

The back wall of each recess or slot 13 is provided with a series of regular pyramids 15 forming a substantially rasp-like or uniformly roughened surface providing V-grooves 16 and 17 crossing diagonally of the surface and at right angles to each other and at an angle of 45° to the opposite faces of the saw body or blade as indicated, and forming said pyramids. This pyramidal toothed surface extends throughout the back face of the slot wall of the several regularly arranged curved inwardly extending slots or recesses 13 previously mentioned.

Adjacent the front wall of the slots 13 of each, is a supplementary slot or recess 18, the same being located at the outer part of each slot 13 adjacent the cut away portion 14 provided for clearance in cutting. Each recess 18 is provided with a groove 19 extending continuously around the wall thereof, the outer portion of which is offset or curved inwardly as indicated at 20 in a manner of a stop or lug, for a purpose to be hereinafter made apparent.

The saw tooth or body thereof is designated at 21 and as shown, the teeth are curved to conform to the back walls of the slots 13 and wedge-shape in plan, the cutting head or wide part 22 of the wedge constituting the cutting edge and the body being tapered on both sides to provide a clearance as will be readily understood. It is also to be understood that the teeth may be made of uniform cross-section without the tapered sides, as shown in the drawing. The teeth are made considerably wider than the body or blade 12 and are provided at their back surfaces or edges with a central longitudinal slot or groove 23 and oppositely arranged angular grooves 24 and 25 on opposite sides of the groove or recess 23. These grooves or slots 24 and 25 also extend in opposite directions at right angles to each other and toward the inner end of the tooth and at an angle of 45° to the length thereof, to correspond with the angular relation of the grooves 16 and 17 produced by the cutting of the alternate V-grooves and V-ribs forming the pyramids 15, the grooves being of V-shaped cross-section so that they will conform thereto and so that the ribs in between the grooves will be received in the grooves of the back wall of the blade or body 12 and vice versa. It is also to be understood that while I have specified a preferred angle, namely, 45°, that the angle may vary. This construction permits the tooth to be arranged in the slot 13 and adjusted to project at one side only by engagement of either ribs and grooves 24 or 25, with the grooves provided by the pyramids 15, or with both of the same and restrains shifting in either direction as well as permits minute adjustments of the teeth to either side of the blade or body 12. When both sides are engaged at ribs and grooves 24 and 25, the teeth are positively held in position and against shifting. In connection with the construction of the back of the tooth or tooth body 21 as described, the front surface thereof is provided with a series of longitudinal grooves and ribs 26 and 27 respectively spaced from the opposite sides and adapted to receive a rib 28 of a resilient or split locking member 29 employed for retaining the tooth in position. These grooves and ribs are also preferably of V-shaped cross-section.

The locking member 29 is provided in the form of a split spring or spreader member having a bifurcation or slot 30 enlarged as indicated at 31 at its inner end, to give the necessary resiliency or spring action as in the manner of a spring wedge and with opposite enlargements or recesses 32 for receiving a locking or spreading pin as will be further set forth. The outer edge of the locking member 29 is provided with a V-shaped rib 28 constituting a projection on its surface and extending entirely around the sides and inner end thereof for engaging one of the grooves 26 and the groove or recess 19 in the body at the recess 18 supplementary to the recess or slot 13, as previously described, and as clearly shown in Fig. 1 of the drawings. When this is accomplished, a pin or wedge 33 is forced into the recesses 32 at the slot 30, to spread to two opposite furcations or portions of the split locking member or block 29, it being understood that the latter is sprung into position after the tooth is inserted and adjusted to its proper position by the construction described, and thereby additionally held by the stop or lug 20.

In the operation of assembling the device, a tooth 21 is first inserted in its slot 13 so that its co-acting ribs and grooves 24 and 25 will engage the respective grooves 16 and 17 provided on the pyramid or rasp surface 15, the tooth being adjusted to project equidistantly at either side of the body or blade 12, as shown in Fig. 8 or to project further at one side, according to the cutting operation and adjustment required. When disposed in adjusted position, the tooth is so held, and the locking member 29 is inserted in the supplementary recess 18 so that the rib 28 will engage the respective grooves 19 and 26, according to the groove 26 which may be in alignment with the groove 19 to receive said rib 28 of the locking member. The locking member, owing to its resilient action and the spreading of the opposite sides or furcations thereof, produced by the slot 30, will spring into position when forced into the recess 18 over the shoulder or curved portion 20. The pin 33 then being forced home, will spread the opposite sides of the locking member into firm engagement with the body and tooth respectively, to securely hold the tooth in position and prevent its accidental displacement. This construction will permit very minute adjustment of the teeth and will thereby permit the tooth to be extended as worn, or to be readily replaced when necessary. The grooved pyramid and rib formation of the tooth and body permits minute adjustment and serves to firmly hold the teeth in position.

It is also pointed out that when a very smooth cut is desired for wood or metal, the teeth can all be adjusted to either side of the saw body, according to the construction of the machine on which it is used. When the saw is used for ripping purposes, the teeth are adjusted alternately in opposite direction and when used for floor finishing, the entire lower edge of the tooth may also be provided with a cutting edge, but this is optional.

In the construction shown in Figs. 10 and 11, the recess or slot 13 and the tooth body 21 are the same, except that the grooves and ribs 26 and 27 may be omitted and the surfaces left plain as indicated at 34, but may be provided with such grooves and ribs as described co-acting with a locking member 35 in the form of a block, from which the slot 30 is omitted. In either case, the outer surface of the locking member or block is cut on a concaved arc or recess to conform to the clearance cut away portion 14 as clearly shown in Figs. 1 and 10 of the drawings. In Figs. 10 and 11, the block 35 is provided with a threaded semi-circular recess 36 co-acting with a similar recess 37 of the adjacent wall of the supplementary recess 38, said recess wall being tapered as indicated at 39 to co-operate with the correspondingly tapered edge 40 of the locking member or block 35, so that when a set screw or the like 41 is engaged with the aperture formed by the co-acting threaded recesses 36 and 37 and screwed into position, the tapered formation thereof will force the locking member or wedge block 35 against the tooth and securely hold the same in position. Obviously, the small end of the set screw 41 may be upset or struck with a center punch to expand the metal thereof and prevent its displacement.

With the above described construction, it will be obvious that the teeth may be readily adjusted after being mounted, and may be readily placed in position or removed to compensate for wear or to replace the same when worn or damaged. It is further obvious that the invention while shown in connection with a circular saw, is equally applicable to a bandsaw or other straight edge saw, and that the teeth need not necessarily be curved for the successful operation thereof. I also wish to have it understood that I may make such other changes in the details of construction, arrangement and proportion of the parts as do not depart from the spirit and scope of the invention as defined by the device as hereinafter claimed.

Having thus described my invention, what I claim is:

1. In a saw, a body provided with recesses to receive saw teeth and locking means therefor, the back of the body having pyramids cut therein to provide intersecting grooves and ribs extending across the body, and the tooth having oppositely inclined alternate grooves and ribs for interlocking engagement therewith.

2. In a saw, a body provided with recesses to receive saw teeth and locking means therefor, the back of the body having pyramids cut therein to provide intersecting grooves extending in planes across the body, and the tooth having a central longitudinal groove at the back and grooves extending rearwardly and outwardly in diverging relation for simultaneous or independent engagement with the respective grooves of the pyramid surface of the body.

3. In a saw construction, a body provided with a recess to receive a saw tooth, a saw tooth engaged therein and provided on one edge with a central longitudinal recess and inwardly extending grooves providing alternate ribs on either side thereof, disposed at angles of 45° to the recess, and the opposed surface of the body having pyramids cut therein in rows at right angles to each other and at angles of 45° to the opposite faces of the body for adjustable engagement with the grooves and ribs of the tooth.

4. In a saw construction, a body provided with a recess to receive a saw tooth, a saw tooth engaged therein, locking means for retaining the tooth in position at the front thereof, and forcing said tooth against the back wall of its recess, the back wall of the recess having pyramids formed therein providing intersecting grooves across its surface, and the back of the tooth having oppositely inclined alternate grooves and recesses for engagement with the grooves provided by the pyramid surface.

5. In a saw construction, a body provided with a recess to receive a saw tooth, a saw tooth engaged therein, locking means for retaining the tooth in position at the front thereof, and forcing said tooth against the back wall of its recess, the back wall of the recess having pyramids formed therein providing intersecting grooves across its surface, and the back of the tooth having oppositely extending alternate grooves and recesses for engagement with the grooves provided by the pyramid surface, all of said grooves and recesses being of V-shaped cross-section.

6. In a saw construction a body provided with a recess to receive a saw tooth, a saw tooth engaged therein and provided on its back face with oppositely extending V-shaped grooves and alternate ribs at opposite sides of its longitudinal center, the back wall of the recess having oppositely extending grooves and pyramids formed thereby to accommodate either side of the co-acting wall of the tooth for adjustment of the tooth centrally or at either side of the body, said body having a supplementary recess co-acting with the front portion of the first named recess, a locking member in said supplementary recess and engaging with the tooth, said body and locking member having co-acting beveled faces, and means to secure the locking member in position by forcing the same against the front face of the tooth.

In testimony whereof I affix my signature.

ANTON WESTGARD.